United States Patent [19]

Ito et al.

[11] 4,181,414
[45] Jan. 1, 1980

[54] SELF DEVELOPING CAMERA WITH FILM FEEDOUT CONTROL

[75] Inventors: Fumio Ito; Mutsuhide Matsuda, both of Yokohama; Ryoichi Suzuki, Kawasaki; Tokuichi Tsunekawa; Takashi Uchiyama, both of Yokohama; Hiroshi Furukawa, Tokyo, all of Japan

[73] Assignee: Canon Kabushiki Kaisha, Tokyo, Japan

[21] Appl. No.: 776,480

[22] Filed: Mar. 10, 1977

[30] Foreign Application Priority Data

Mar. 12, 1976 [JP] Japan ................................. 51/27566
Mar. 12, 1976 [JP] Japan ................................. 51/27570

[51] Int. Cl.² ............................................. G03B 17/53
[52] U.S. Cl. ....................................... 354/83; 354/171; 354/173; 354/212; 354/60 R
[58] Field of Search ................. 354/53, 60 R, 60 L, 354/83–86, 170, 171, 173, 212, 213, 289; 352/170, 171; 242/71.5

[56] References Cited

U.S. PATENT DOCUMENTS

| | | | |
|---|---|---|---|
| 3,405,617 | 10/1968 | Land et al. | 354/84 X |
| 3,705,537 | 12/1972 | Paglia | 354/ |
| 3,784,292 | 1/1974 | Winkler et al. | 352/170 |
| 3,928,862 | 12/1975 | Ijester et al. | 354/86 |
| 3,947,855 | 3/1976 | Inoue et al. | 354/602 |
| 3,967,297 | 6/1976 | Eloranta et al. | 354/86 X |
| 4,025,935 | 5/1977 | Waggensonner et al. | 354/173 |

*Primary Examiner*—L. T. Hix
*Assistant Examiner*—William B. Perkey
*Attorney, Agent, or Firm*—Toren, McGeady and Stanger

[57] ABSTRACT

The present invention relates to a camera using a photo-sensitive sheet material of self developing process type, which can actuate a photo-sensitive material take out device to take out the exposed photo-sensitive material sheet material to outside of the camera while conducting self developing process thereon, selectively by an electric motor or manually, and has a checking device to check whether or not the voltage of a battery to drive said electric motor is at a level to be able to properly activate said photo-sensitive material take out device, further has a means to direct to stop power supply to said motor when the voltage of said battery is below said level and to activate said photo-sensitive take out device manually.

23 Claims, 6 Drawing Figures

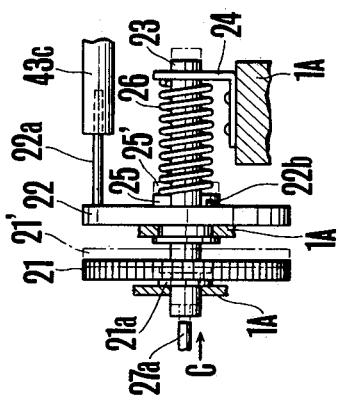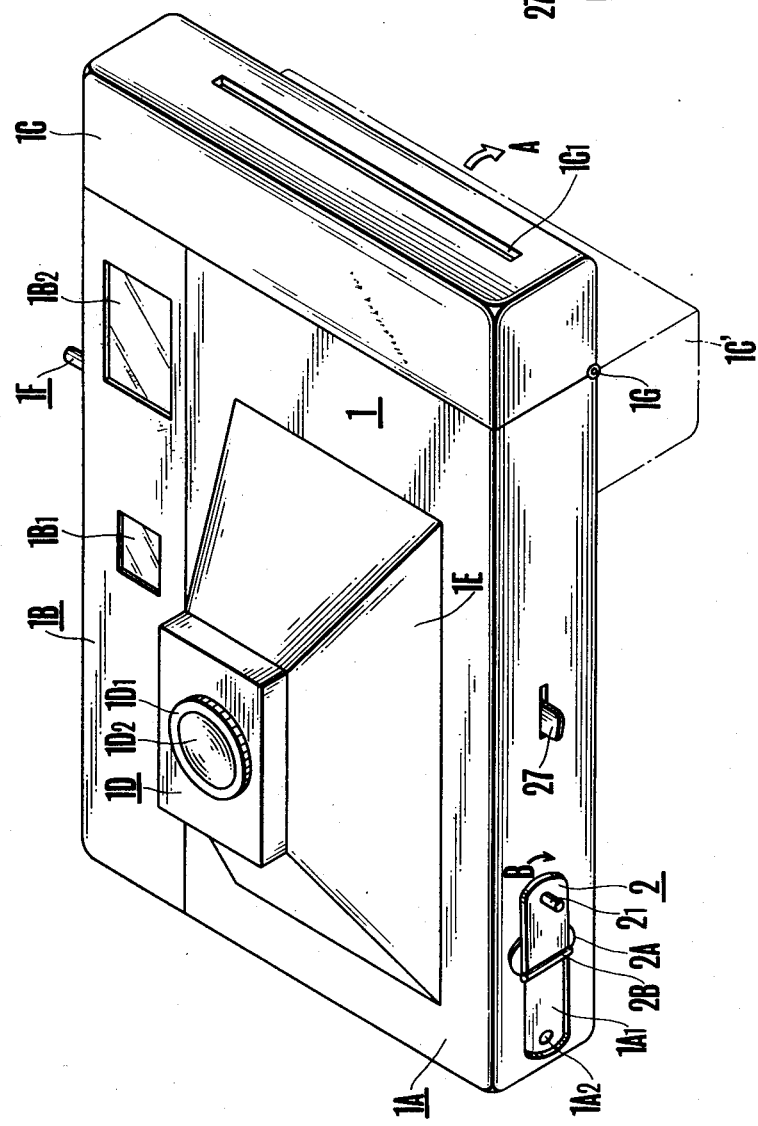

FIG.5

SELF DEVELOPING CAMERA WITH FILM FEEDOUT CONTROL

BACKGROUND OF THE INVENTION

1. Field of the Invention

The present invention relates to a camera which uses photo-sensitive sheet material of self developing process type.

2. Description of the Prior Art

A photo-sensitive sheet material of self developing process type and a camera using said photo-sensitive sheet material, that is a camera generally called as an instant picture camera have been placed in a practical use heretofore and many kinds of such photo-sensitive sheet material and camera are found in patent specifications, etc. For example, U.S. Pat. No. 3,682,076 discloses in its specification photo-sensitive sheet material of self developing process type having a bag to store self developer liquid. This photo-sensitive sheet material is so made that said bag storing developer liquid is broken as said sheet shape material is taken out of a camera after exposure and self developing process is done by spreading the developer liquid flowing out of the bag over the surface of the photo-sensitive sheet material. And several pieces of said photo-sensitive sheet material are placed within a film cartridge in a laid up manner, and are loaded into a camera as said film cartridge is loaded into an exposure part of the camera. On the other hand, an instant picture camera using such film cartridge is found in the specification of U.S. Pat. No. 3,689,262, etc., and said camera is so made that said photo-sensitive sheet material in the film cartridge is exposed one sheet by one sheet and as the exposure of a first sheet material is completed said exposed sheet material is taken out to outside of the camera from the exposure part within the camera by a photo-sensitive material take out mechanism. While said photo-sensitive sheet material passes through between pressure contacting rollers of the photo-sensitive material take out mechanism as said shut material is taken out to outside of the camera by said mechanism, a developer liquid storing bag within the photo-sensitive sheet material is broken by the pressure of said pressure contacting rollers and developer liquid flows out onto the surface of the photo-sensitive material from the bag. Said developer liquid flowing out from said storing bag onto said surface of the photo-sensitive material will be uniformly spread on the surface of the photo-sensitive sheet material by the pressure contacting rollers as the photo-sensitive sheet material passes through the rollers. While said photo-sensitive material take out mechanism is driven by an electric motor or in a manual manner, it is very import for obtaining good finish of pictures to uniformly spread the developer liquid without uneven spots etc. over the surface of the photo-sensitive sheet material in self developing process of said sheet material of self developing process type. Therefore it is necessary to have the photo-sensitive sheet material pass through between the pressure contacting rollers with almost constant speed for uniformly spreading the developer liquid over the surface of the sheet material without uneven spots etc. Thus even a conventional instant picture camera, having a photo-sensitive material take out mechanism driven by an electric motor is so made that even when the motor tends to drive said take out mechanism at a speed faster than a prescribed speed and said take out mechanism tends to take out the sheet material in faster speed, the driving speed of the photo-sensitive material take out mechanism is restrained by a governor device, but when the rotation of the electric motor can not drive the take out mechanism with a prescribed speed there is no means provided for stopping the take out function of said take out mechanism. Same disadvantage exists as the photo-sensitive take out mechanism is activated manually, that is even when the take out mechanism is driven manually in a speed faster than a prescribed speed, the driving speed of the mechanism is restrained by a governor device, but when the photo-sensitive material take out mechanism is driven manually at a speed slower than the prescribed speed, there is no means provided to stop the take out function of said take out mechanism. That is in a conventional instant picture camera of this type when a photo-sensitive material take out mechanism is driven by an electric motor or in a manual manner, even if said mechanism tends to take out the photo-sensitive sheet material at a speed faster than a prescribed speed the driving speed is restrained by a governor device thus the sheet material will not be taken out at a speed faster than a prescribed speed, but when the photo-sensitive material take out mechanism tends to take out the photo-sensitive sheet material at a speed slower than the prescribed speed, the take out function thereof will not be stopped, thus the photo-sensitive material take out mechanism could take out the photo-sensitive sheet material at a speed slower than the prescribed speed. The driving of the take out mechanism at a speed slower than the prescribed speed as it is driven manually is caused by an improper handling at a part of a camera operator, and it could be solved by exercising proper care at a part of the operator. However, a cause for driving the photo-sensitive material take out mechanism at a speed slower than the prescribed speed as it is driven by an electric motor lies in many instances in the lowering in the voltage of a power source used. In this case, an operator can detect the lowering in the voltage of the power source and replace the power source battery, but when there is no ready replacement battery available even if the lowering in the power source battery is detected, an operator only can not be accused.

Therefore in such instant picture camera, particularly in a camera to drive a photo-sensitive material take out device by an electric motor a set up having a means to check whether or not a power source voltage enough to drive the electric motor at a prescribed speed is available and to display the same is desired, further a set up having a means to stop the function of the photo-sensitive material take out mechanism as the power source voltage is found to be below a prescribed voltage and a means being able to drive the take out device manually in place of the driving by an electric motor is desired.

Also, such instant picture camera has a problem that a size of photo-sensitive material used is larger by far than that of a roll film of 35-mm size, etc., thus the size and shape of an instant picture camera becomes quite large compared to those of a common camera using a 35-mm roll film, resulting in a very poor portableness. Therefore, to solve said problem, a conventional instant picture camera employs a structure to connect a photographing lens part and a camera main body by bellows, etc., and said bellows are extended as photographing is done to secure the length of optical axis between the photographing lens part and the camera main body suitable for photographing, and to shrink the bellows as photographing is not done to have the photographing lens part and the camera main body placed very close to each other thus securing a compactness of a camera. Thus it is very important in an instant picture camera of this type to secure compact size of a camera and for example for a power source battery housed therein, it is desired to reduce the number of the same and the size of the same. Therefore a conventional instant picture camera ordinarily has only one power source battery housed therein and all other necessary parts in the camera are driven by said one power source battery to reduce the space occupied by the power source battery within the camera. For example, the only one power source battery housed in the camera is used to drive an exposure control device besides the driving of a photo-sensitive material take out device. Thus in an instant picture camera in which a photo-sensitive material take out device and an exposure control device are activated by one power source battery, it is desired to employ such set up that a power source voltage checking device is provided to check the voltage of the power source battery as the amount of the power source voltage flowing to an electric motor to activate the photo-sensitive material take out device needs to be strictly controlled as mentioned above, and a warning is given to a camera operator to exercise care in operating the camera when the voltage of the power source battery can not properly drive various devices of the camera. Therefore, even a conventional instant picture camera of this type has necessary considerations made for that and has such set up that a total function of a camera becomes inactive and a camera can not be used when the voltage level of a power source battery can not properly drive a photo-sensitive material take out device. However, in an instant picture camera to operate both a photo-sensitive material take out device and an exposure control device by one power source battery, the power source battery necessary to drive the voltage of the photo-sensitive material take out device is at higher level than the amount of power source voltage necessary to drive the exposure control device, and even if the voltage level of said power source battery can not properly drive the photo-sensitive material take out device, it does not necessarily means that said voltage can not properly drive the exposure control device, instead in many cases said voltage is at such level as being sufficient to be able to properly activate the exposure control device which actually contributes to photographing although not being able to properly drive the take out device. Therefore, it is very desirable in practical use that when the voltage level of the power source battery is at a value to properly drive the exposure control device even if it can not properly drive the photo-sensitive material take out device, the driving of the exposure control device is done by the power of the power source battery and the driving of the photo-sensitive material take out device is changed over from an electric motor to manual, that is a means is provided to avoid the driving of the take out device by the power source battery as the voltage thereof becomes below a prescribed value so that when the photo-sensitive material take out device does not function it can be properly operated manually, thus avoiding such inconveniences that a photographing can not be done at all even if a capacity of a power source battery is lowered.

Also in this type of instant picture camera it is very troublesome if a handling for shutter charge is to be done independently for conducting the shutter charge of a shutter mechanism, thus generally such shutter mechanism is used that a shutter mechanism and a photo-sensitive material take out device are linked and the shutter charge of the shutter mechanism is done in an association with the take out function of the photo-sensitive sheet material by the photo-sensitive material take out device. And it is so set beforehand that as a trigger action is initiated a shutter mechanism already charged releases its charged power first then as the function of the shutter mechanism is completed a photo-sensitive material take out device is activated. And as said photo-sensitive material take out device is activated the shutter mechanism is charged again in an association with the action of said take out device. While said series of the shutter mechanism and the photo-sensitive material take out device are so arranged that as the charged power of the shutter mechanism is released the photo-sensitive material device is activated then without fail to take out one sheet of the photo-sensitive sheet material to outside of the camera, and at a same time the shutter mechanism is charged again, but said conventional instant picture camera has a set up that a so-called "multiple exposure" exposure method can not be done that is when the shutter mechanism is one activated a shutter mechanism can not be charged again without taking out the photo-sensitive sheet material to outside of the camera even if the photo-sensitive material take out mechanism functions for making another exposure over the photo-sensitive sheet material already exposed once by the previous action of the shutter mechanism. However, a case in which such exposure method as multiple exposure is desired will not be rare depending on applications of a camera, and it is desirable to provide a function to conduct multiple exposure in this kind of instant picture camera for using the camera in every possible applications.

SUMMARY OF THE INVENTION

A first object of the present invention is to provide an instant picture camera which solves the problems in a conventional instant picture camera and satisfies the above mentioned functions desired in this kind of instant picture camera.

A second object of the present invention is to provide an instant picture camera which can uniformly coat the surface of a photo-sensitive material with developer liquid contained within a bag storing developer liquid provided at a photo-sensitive sheet material.

A third object of the present invention is to provide an instant picture camera in which a photo-sensitive material take out device to take out the photo-sensitive sheet material loaded in a camera to outside of the camera can be driven selectively by an electric motor.

A fourth object of the present invention is to provide an instant picture camera which drives a photo-sensitive material take out device by electric power and it is checked whether or not the voltage of a power source battery to drive the photo-sensitive take out device is at a level being able to properly drive said take out device and the state thereof is displayed, and at a same time when said voltage is not at a prescribed level or above the driving of the take out device by electric power is automatically blocked, instead a direction is given to drive the same manually.

A fifth object of the present invention is to provide an instant picture camera which has a set up that the charging of a shutter mechanism is done in an association with the action of a photo-sensitive material take out device, and when multiple exposure is done even when the photo-sensitive material take out device is activated the photo-sensitive sheet material is blocked from being taken out to outside of the camera and the charging of the shutter mechanism only can be done.

A sixth object of the present invention is to provide an instant picture camera which has a safety device provided therein not to conduct the taking out of photo-sensitive sheet material as the taking out of the same is done by the power of a motor and an automatic change over is so made that the manual handling of the photo-sensitive material take out device is possible only when the voltage of the power source battery is not at a level being able to properly drive said photo-sensitive material take out device.

Other objects of the present invention will be made clear from the specification and the drawings to be explained below in detail.

BRIEF DESCRIPTION OF THE DRAWINGS

FIG. 1 is an external oblique view of a camera according to the present invention.

FIG. 3 is a side elevation to explain in detail a multiple exposure device of a camera shown in FIG. 2.

FIG. 5 and FIG. 6 are to show a camera as a second example of the present invention modifying a portion of the camera as the first example shown in FIGS. 1 to 4, wherein FIG. 5 is an oblique view to show a set up of important members provided within said camera, while FIG. 6 is a control electric circuit diagram applied to a camera shown in FIG. 5.

DESCRIPTION OF THE PREFERRED EMBODIMENTS

Now an example of a camera according to the present invention will be explained in detail using drawings.

Figure 2:
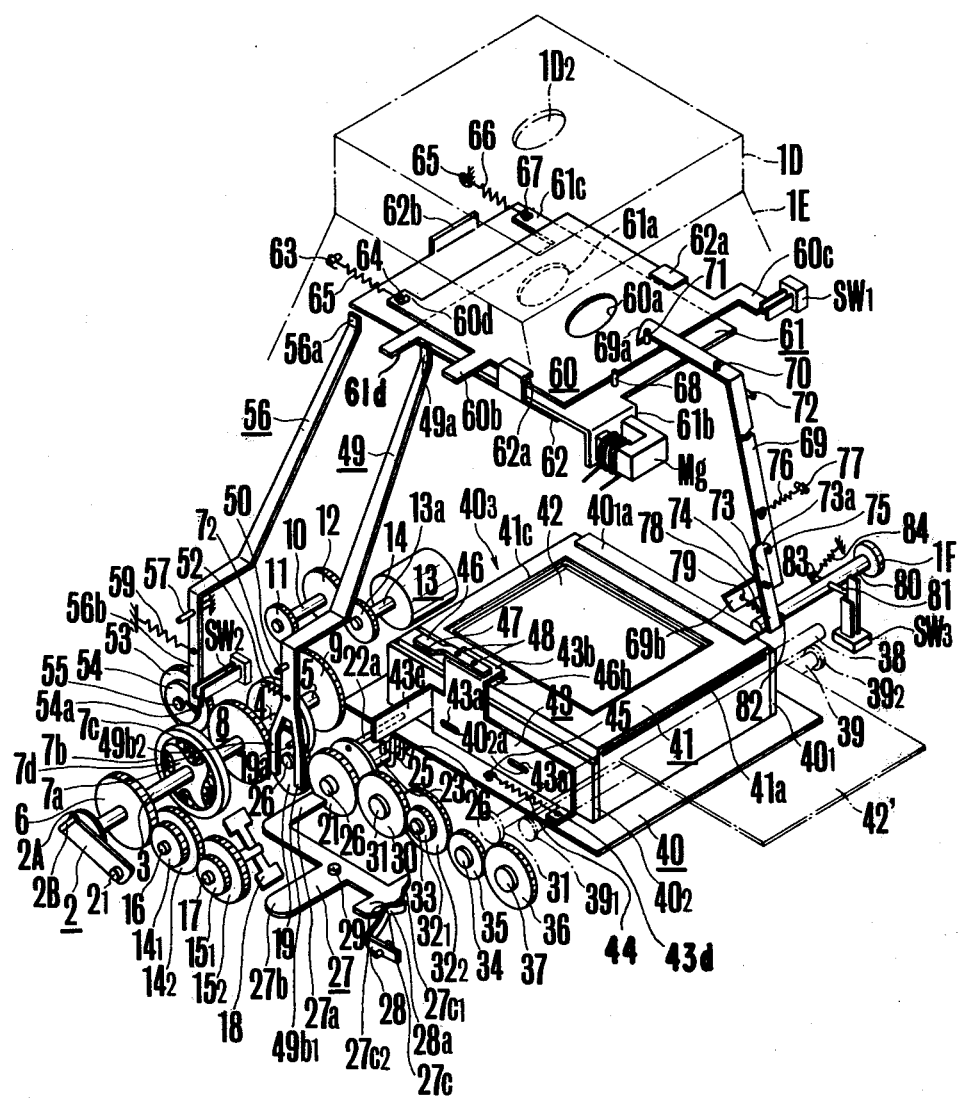
FIG. 2 is an oblique view to show a set up of important members provided within a camera according to a first example of the present invention.

FIG. 1 is an oblique external view of a camera according to the present invention. In FIG. 1, what is shown as 1 is a camera main body, and 1A is a camera base body, 1B is a finder frame work, 1C is a frame work to load and unload a film cartridge, 1D is an optical frame work, and 1E is a dark box frame work. The finder frame work 1B is provided at an end of the camera base body 1A and has a range finder window 1B, and a photo-sensing window $1B_2$. The frame work 1C for loading and unloading a film cartridge is hinged on the camera base body 1A with a hinge 1G. If a rotating bias force applied from outside about the hinge 1G as a fulcrum in a direction of an arrow A in the drawing when the film cartridge is loaded or unloaded, it rotates in the direction of arrow A to the position shown as 1C' in the drawing. This forms an opening in the camera base body 1 for loading and unloading of a film cartridge into or out of a film cartridge housing chamber within the camera base body. Also the frame 1C has a photo-sensitive material take out opening $1C_1$ provided therein to take out the exposed photo-sensitive sheet material as will be explained below. What is shown as $1D_1$ is a lens body mount which holds a photographing lens $1D_2$ and has a range adjusting ring to adjust focus and is retained by the photographing optics frame work 1D. And a conventionally known types of exposure adjusting mechanism (not shown in the drawing) and range adjusting device (not shown in the drawing), etc. are provided within said photographing optics frame work 1D beside a shutter mechanism shown in FIG. 2. What is shown as 2 is a manual handling lever used in a case when the photo-sensitive material take out device shown in detail in FIG. 2 is handled manually and is fixed through a hinge 2B on a rotation plate 2A axially supported at a bottom of the camera base body 1A in a rotatable manner. What is shown as $2_1$ is a knob planted on the manual handling lever 2. Said manual handling lever 2 is baried within a lever housing recess $1A_1$ provided at a bottom of the camera base body 1A when not in use, and is pulled up and is placed in a state shown in FIG. 1 for use.

FIG. 2 is an oblique view to show a set up of important members provided within a camera according to the present invention. What is shown as 3 is a rotation axle axially supported at the camera base body 1A in a rotatable manner together with the rotation plate 2A, wherein the rotation axle 3 and the rotation plate 2A are in a fixed relationship and the rotation axle 3 will be rotated by rotating the manual handling lever 2. What are shown as 4, 5 are rotation axles axially supported similarly at the camera base body 1A in a rotatable manner and said rotation axles 3, 4, 5 are arranged coaxially on a straight line. What is shown as 6 is a spur gear fixedly provided on the rotation axle 3, and what is shown as $7_1$ is a one way clutch device. Said one way clutch device itself is a conventionally known device, and what is shown as 7a is a ratchet wheel fixedly provided at one end of the rotation axle 3, while 7b is a ratchet wheel receptacle fixedly provided at one end of the rotation axle 4 and said ratchet wheel 7a is positioned being fitted within said ratchet wheel receptacle 7b. What is shown as 7c is a roller provided within the ratchet wheel receptacle 7b and one piece of said roller 7c is provided respectively between each claw of the ratchet wheel 7a. What is shown as 7d is a coil spring provided within the ratchet wheel receptacle 7b, and one end of said coil spring 7d is engaged with the claw of the ratchet wheel 7a, while the other end thereof is engaged with the roller 7c, thus one piece of said spring is provided respectively between claws of the ratchet wheel 7a to pressure contact the roller 7c against the claw of the ratchet wheel 7a and the inner wall of the ratchet wheel receptacle 7b. And said one way clutch device $7_1$ is so made that when the rotation axle 3 is rotated to a clockwise direction the roller 7c comes into between the claw of the ratchet wheel 7a and the inner wall of the ratchet wheel receptacle 7b to transmit the rotation of the rotation axle 3 to the rotation axle 4 through the ratchet wheel 7a and the ratchet wheel receptacle 7b, on the other hand when the rotation axle 3 is rotated from the manual handling lever 2 side to counter clockwise direction and when no rotation force is not given from outside to the rotation axle 3 and the rotation force to clockwise direction from the rotation axle 4 side to the ratchet wheel receptacle 7b, the action force to a direction contrary to the direction of the roller 7c comes into between the claw of the ratchet wheel 7a and the inner wall of the ratchet wheel receptacle 7b is given by the inner wall of the ratchet wheel receptacle 7b, therefore the action force transmission relationship between the ratchet wheel 7a and the ratchet wheel receptacle 7b is cut out and the co-operative relationship between the rotation axles 3 and 4 will be ineffective. What is shown as 8 is a spur fixedly provided on the rotation axle 4, and $7_2$ is a one way clutch device to control the power transmission between the rotation axle 4 and the rotation axle 5. This one way clutch device $7_2$ has a same set up with that of the clutch device $7_1$ provided between the rotation axles 3 and 4 with only exception that the direction to transmit the power is exactly inversed. That is, the ratchet wheel receptacle 7b of the clutch device 2 is fixedly provided at the other end of the rotation axle 4, and the ratchet wheel 7a is fixedly provided at one end of the rotation axle 5, and the direction of the claw of the ratchet wheel 7a of said clutch device $7_2$ is inverse to the direction of the claw of the ratchet wheel 7a of the clutch device $7_1$. Therefore, said clutch device $7_2$ is so made that when the rotation axle 5 is rotated to clockwise direction the rotation thereof is transmitted to the rotation axle 4, and when the rotation axle 5 is rotated to counter clockwise direction or when the rotation axle 5 is not rotated and the rotation axle 4 is rotated to clockwise direction, the rotation of said rotation axle 4 is not transmitted to the rotation axle 5.

That is, the relationship between the clutch device $7_1$ and the clutch device $7_2$ is such that when the rotation of the rotation axle 3 is transmitted to the rotation axle 4 the rotation of the rotation axle 4 is not transmitted to the rotation axle 5, and contrary thereto, when the rotation of the rotation axle 5 is transmitted to rotation axle 4, the rotation of the rotation axle 4 is not transmitted to the rotation axle 3.

What is shown as 9 is a spur gear fixedly provided at the other end of the rotation axle 5. What is shown as 10 is a rotation axle axially supported at the camera base body 1A in a rotatable manner, and spur gears 11, 12 are fixedly provided at both ends of said rotation axle 10, wherein the gear 11 is always in an engaged relationship with the gear 9. What is shown as 13 is an electric motor fixedly provided at the camera base body 1A, and what is shown as 14 is a spur gear fixedly provided on the motor axle 13a of the motor 13, and said spur gear 14 is always in an engaged relationship with the gear 12. What are shown as $14_1$, $14_2$ are spur gears fixedly provided on a rotation axle 16 axially supported at the camera base body 1A in a rotatable manner, and said gears $14_1$, $14_2$ are formed integrally with synthetic resin, while the gear $14_1$ is always in an engaged relationship with the gear 6. What are shown as $15_1$, $15_2$ are spur gears fixedly provided on a rotation axle 17 being axially supported at the camera base body 1A in a rotatable manner, wherein said gears $15_1$, $15_2$ are integrally made with synthetic resin, while the gear $15_1$ is always in an engaged relationship with the gear $14_2$. What is shown as 18 is a flat plate fixed provided at one end of the rotation axle 17 and said plate 18 rotates integrally with the rotation axle 17 as said rotation axle 17 rotates and well receives air resistance at a time of its rotation and is provided to perform a role to have the rotation axle 17 make constant speed rotation. Said gears 6, $14_1$, $14_2$, $15_1$, $15_2$ consist an over-drive gear mechanism, and as the manual handling lever 2 is manually rotated and the rotation axle 3 is rotated, the rotation of the rotation axle 3 is transmitted to the rotation axle 17 through the gears 6, $14_1$, $14_2$, $15_1$, $15_2$ in turn, wherein the rotation of said rotation axle 3 will maintain its constant speed by the action of the over-drive gear mechanism 6, $14_1$, $14_2$, $15_1$, $15_2$ and the flat plate 18. What is shown as 19 is a spur gear fixedly provided at a rotation axle 20 being axially supported at the camera base body 1A in a rotatable manner, and said gear 19 is always in an engaged relationship with the gear 8, and has a planted pin 19a. What is shown as 21 is a spur gear always in an engaged relationship with the gear 19, while what is shown as 22 is a round disk, and details of said gear 21 and disk 22 will be shown in FIG. 3. That is FIG. 3 is a plan to explain a set up which allows multiple exposure in a camera according to the present invention, wherein a gear 21 is fixedly provided at a rotation axle 23 which is retained by the camera base body 1A and the axle retention member 24 fixedly provided at said camera base body 1A in a manner allowing rotation and sliding to an axial direction thereof. Also said disk 22 is axially supported on the rotation axle 23 in a rotatable manner and at a same time is so restrained by the camera base body 1A as not to be shifted to its axial direction, also has a long pin 22a and a short pin 22b planted on its surface not facing said gear 21. And a pin 25 engageable with the short pin 22b of the disk 22 is planted on said rotation axle 23 and at a same time a compression coil spring 26 is provided between said pin 25 and the axle retention member 24. Said spring 26 is to bias the rotation axle 23 always to left direction in FIG. 3, and when a force from a direction of arrow C is not given to the rotation axle 23, the rotation axle 23 is shifted to left direction to a position at which the pin planted on the rotation axle 23 comes in contact with the disk 22 (shown by solid line), also as such force as overcoming the biasing power of the spring 26 is given to the rotation axle 23 from a direction of an arrow C, it can be shifted to a position at which the pin 25 will not be engaged with the pin 22b of the disk 22 (shown by a dot and dash chain line and having "dash" mark ' placed to corresponding part numbers). And when the rotation axle is at a position being shown by solid line in FIG. 3 at which the pin 25 can be engaged with the pin 22b, the rotation of the gear 21 is transmitted to the disk 22 through the rotation axle 23, and when the rotation axle 23 is shifted to a position being shown by a dot and dash chain line in FIG. 3 at which the pin 25 and the pin 22b can not engage each other, the rotation of the gear 21 is not transmitted to the disk 22, thus even when the gear 21 and the rotation axle 23 rotate the disk 22 will not be rotated, and this mechanism is provided to conduct multiple exposure. What is shown as 27 is a photographing mode change over member to conduct slide shifting of said rotation axle 23 and to change over multiple exposure photographing and ordinary exposure photographing, and said member 27 is axially supported at an axle 29 fixedly provided at the camera base body 1A in a rotatable manner and consists of a pressing part 27a, a change over knob part 27b and a click stop part 27c. Said click stop part 27c of the photographing mode change over member 27 has a stop part $27c_1$ for ordinary exposure photographing and a stop part $27c_2$ for multiple exposure photographing provided therein. What is shown as 28 is a click spring fixedly provided at its one end at the camera base body 1A and its other end forms a free end, while the free end of said click spring 28 is always pressure contacted with the click stop part 27c, wherein when the change over member 27 is so moved by handling of the knob part 27b protruding to outside of the camera main body 1 that the stop part 27c of the change over member 27 comes to a position corresponding to the engaging part 28a of the spring 28, the engaging part 28a drops in the stop part $27c_1$, retaining the change over member 27 in such state, and contrary to this when the stop part $27c_2$ comes to a position by handling of the knob part 27b to a position corresponding to the engaging part 28a of the click spring 28, the engaging part 28a drops in said stop part 27c$_2$, retaining the change over member 27 in such state. In a state at which the engaging part 28a of the click spring 28 and the stop part 27c are engaged, the change over 27 is at a state at which it is rotatingly shifted to counter clockwise direction using the axle 29 as a fulcrum, while the pressing part 27a$_1$ of said change over member 27 does not give a force to a direction of arrow C in FIG. 3 to the rotation axle 23, but in a state in which the engaging part 28a of the spring 28 and the stop part 27c$_2$ are engaged, the change over member 27 is placed in a state as being rotatingly shifted to clockwise direction using the axle 29 as a fulcrum, and the pressing part 27a$_1$ of said change over member 27 gives a force to a direction of arrow C in FIG. 3 to the rotation axle 23, releasing the engagement between the rotation axle 23 and the disk 22. What is shown as 30 is a spur gear fixedly provided at a rotation axle 31 axially supported at the camera base body 1A in a rotatable manner and is always in an engaged relationship with the gear 21. What are shown as 32$_1$, 32$_2$ are spur gears fixedly provided on a rotation axle 33 axially supported at the camera base body 1A in a rotatable manner, and said gears 32$_1$, 32$_2$ are integrally formed and the gear 32$_1$ is always in an engaged relationship with the gear 30. What is shown as 36 is a spur gear fixedly provided at a rotation axle 37 axially supported at the frame work 1C for loading and unloading film cartridge in a rotatable manner, and said gear 36 is in an engaged state with the gear 35 when the frame work 1C for loading and unloading film cartridge is at a state shown by solid line of FIG. 1 against the camera base body 1A, and it is shifted together with said frame work 1C for loading and unloading film cartridge when the frame work 1C is at a state shown by a dot and dash chain line, releasing the engagement with the gear 35. What are shown as 38, 39 are a pair of rollers for taking out photo-sensitive material being axially supported at the frame work 1C in a rotatable manner, and said rollers 38, 39 are provided at a position desired for taking out the photo-sensitive sheet material passing through said rollers 38, 39 out of the opening 1C for taking out the photo-sensitive material. And the gear 31 is fixedly provided at one end of said roller 38 and said gear 31 and the gear 36 are always in an engaged state. Spacer rollers 39$_1$, 39$_2$ are fixedly provided at both ends of said roller 39 for providing a gap desired for having the photo-sensitive sheet material pass through between the roller 39 and the roller 38 and for obtaining the rotation of said roller 38 as the roller 38 is rotated, and said spacer rollers 39$_1$, 39$_2$ are formed by for example rubber material, etc. having great coefficient of friction for obtaining rotation of the roller 38. And the gap provided between said rollers 38 and 39 is so designed as being able to break the bag for developer liquid of the photo-sensitive sheet material by the pressure of the rollers 38 and 39 when the photo-sensitive sheet material of self developing type having a bag to store self developer liquid is passed through between said rollers 38 and 39 and to spread the developer liquid flowing out of said bag over the surface of the photo-sensitive material. What is shown as 40 is a base plate of the film cartridge housing chamber and said base plate 40 is fixed at the camera base body 1A. The base plate 40 has a side wall plates 40$_1$, 40$_2$, 40$_3$ at 3-side planes except the portion through which the film cartridge is loaded and unloaded, and the side wall plate 40$_1$ has a restraining bent part 40$_{1a}$ formed for restraining the film cartridge 41 loaded into the film cartridge housing chamber from shifting upward and the positioning of the film cartridge 41 loaded into the cartridge housing chamber is done by these side wall plates 40$_1$, 40$_2$, 40$_3$. A plurality of photosensitive sheet materials 42 of self developing process type having a bag to store self developer liquid as disclosed for example in the specification of U.S. Pat. No. 3,682,076 are laid up and housed in the film cartridge 41. The film cartridge 41 has a photo-sensitive material take out outlet 41a for taking out the photo-sensitive sheet material being exposed, a notched part 41b to allow a member for pushing out the exposed photo-sensitive sheet material 42 from the outlet 41a to enter thereinto, and an exposure opening 41c to expose the photo-sensitive sheet material 42, formed respectively thereon. Also a biasing means to press a plurality of photo-sensitive sheet material 42 laid up and housed in the film cartridge 41 to the exposure opening 41c side, for example a plate spring is provided at the bottom of the film cartridge 41, and as the exposed photo-sensitive sheet material 42 on a top of the laid up pile is taken out of the outlet 41a after bein exposed, next photo-sensitive sheet material 42 is shifted upward by the biasing power of said biasing means and is automatically shifted to a desired exposure position, also said photo-sensitive material take out outlet 41a is controlled to such size that only one sheet material 42 can be taken out without fail by one take out action. What is shown as 43 is a base plate of a photo-sensitive sheet material preliminary take out device for taking out the photo-sensitive sheet material one by one from the photo-sensitive material take out outlet 41a and carry out the forward end of the photo-sensitive sheet material to a position where said end is sandwiched between the rollers 38 and 39, and said base plate 43 has a guide long hole 43a extended in a take out direction of the photo-sensitive sheet material 42, a restraining bent part 43b to restrain the film cartridge 41 loaded into the film cartridge housing chamber from shifting upward, an engaging part 43c to engage itself with the long pin 22a planted on the disk 22, and a bent part 43d engaged with one end of a pull spring 44 are provided therein. And the base plate 43 is so provided that the guide long hole 43a engages the pin 40$_{2a}$ planted on the side wall plate 40$_2$ of the base plate 40 and is restrained to a direction of taking out the photo-sensitive sheet material 42 by the guide long hole 43a and the planted pin 40a and becomes slidable. Said spring 44 has its one end engaged with the bent part 43d of the base plate 43 and has the other end thereof engaged with the pin 45 planted on the base plate 40 and is to shift and bias always the base plate 43 to a direction inverse to the direction of taking out the photo-sensitive material. What is shown as 46 is a leaf spring for taking out photo-sensitive material being fixed at the bent part 43b of the base plate 43 by set screw 48 in such manner as being provided in the notched part 41b of the film cartridge 41 as the film cartridge 41 is loaded in the cartridge housing chamber, and a friction member 47 made of for example rubber, etc. having great coefficient of friction is placed on a plane of the leaf spring 46 facing the photo-sensitive sheet material 42. And said friction member 47 is pressure contacted to the photo-sensitive sheet material 42 within the cartridge 41 by said leaf spring 46 and shifts the photo-sensitive sheet material 42 on a top of the pile in the cartridge 41 to a direction of the photo-sensitive material take out outlet 41a as the base plate 43 is shifted to a direction of take out, and slides until the forward end of the photo-sensitive sheet material 42 being taken out of the photo-sensitive material take out outlet 41a is sandwiched between the rollers 38, 39. Said sliding of the base plate 43 is done by the rotation of the disk 22. That is, the long pin 22a of the disk 22 and the engaging part 43c of the base plate 43 are placed at such positions that they engage each other as the long pin 22a rotates by the rotation of the disk 22, and as the long pin 22a rotates and engages with the engaging part 43c, the base plate 43 is pressed to a direction of take out and is slidingly shifted by said pressing power and it is continued until the engagement between the long pin 22a and the engagement part 43c is released. What is shown as 49 is a shutter charge lever which can swing and is fixedly provided at an axle 50 axially supported at the camera base body 1A, and one end 49a of said lever 49 is extended to a position at which it can engage with a part of the leader screen of shutter described later, while the other end 49b thereof are formed in a forked shape. The branches 49$b_1$, 49$b_2$ of the other end 49b of said lever 49 are positioned within a locus of rotation of the pin 19a planted on the gear 19, and as the pin 19a comes in contact with the branch 49$b_1$, the lever 49 rotates by the pressing of the pin 19a to counter clockwise direction using the axle 50 as a fulcrum, while contrary to this when the pin 19a comes in contact with the branch 49$b_2$, it rotates to clockwise direction, also said lever 49 is always rotatingly biased to clockwise direction by a pull spring 52 which has its one end engaged with said lever 49 and the other end engaged with the pin 51 planted on the camera base body 1A. What is shown as 53 is a spur gear fixedly provided at a rotation axle 55 axially provided at the camera base body 1A in a rotatable manner, and said gear 53 is always in an engaged relationship with the gear 8. What is shown as 54 is a cam member of a round disk shape fixedly provided on the same rotation axle 55 as the gear 53, and a recess 54a is formed at a part of circumference of said cam member 54. What is shown as 56 is a transporting motor control lever which can swing and is fixedly provided at an axle 57 axially supported at the camera base plate 1A, and is always rotatingly biased to clockwise direction by a pull spring 59 which has its one end engaged with said lever 56 and the other end engaged with the pin 58 planted on the camera base body 1A, and said one end 56a thereof is extended to a position at which it can be engaged with a part of the shutter follower screen to be described later, while the other end 56b thereof is always in contact with the circumferential cam surface of the cam member 54. What is shown as SW$_2$ is an opening and closing switch to control the power supply to the motor 13, and is fixed to the camera base body 1A in such manner that it is placed at a position as being closed by the pressing power of the lever 56 when said lever 56 is shifted to counter clockwise direction, and being opened when the lever 56 drops in the recess 54a of the cam member 54 and is shifted to clockwise direction, being contrary to the above.

What is shown as 60 is a leader screen provided within the photographing optics frame work 1D to constitute a shutter device, and what is shown as 61 is a follower screen. What is shown as 62 is a shutter screen retaining plate to guide the sliding of the shutter screens 60 and 61, and said retaining plate 62 has restraining bent parts 62a and 62b. Said shutter leader screen 60 has an exposure opening 60a, an engaging part 60b being engageable with one end 49a of said shutter charge lever 49, a switch control part 60c and a spring engaging part 60d, and at a same time is always biased to be shifted to left direction in FIG. 3 by a pull spring 65 having its one end engaged with a pin 63 planted on the photographing optics frame work 1D and having the other end thereof engaged with a pin 64 planted on the engaging part 60d of the leader screen 60. Also said shutter follower screen 61 is positioned in an overlapping relationship with said leader screen 60, and has an exposure opening 61a, a bent part 61b, a spring engaging part 61c and an engaging part 61d engageable with one end 56a of the transport motor control lever 56, and at a same time is always so biased as to be shifted to left direction in FIG. 3 by a spring 66 having its one end engaged with a pin 65 planted on the photographing optics frame work 1D and the other end engaged with a pin 67 planted on the engaging part 61c of said follower screen 61. What is shown as 68 is a pin planted on the follower screen 61, and said pin 68 is to have the follower screen 61 returned together with the leader screen as the leader screen 60 is returned by the shutter charge lever 49 to right direction in FIG. 3. What is shown as 69 is a checking lever which can swing and is axially supported at the photographing optics frame work 1D in a rotatable manner, and a checking claw part 69a formed at one end of said checking lever 69 to engage with a stopper pin 71 planted on the shutter leader screen and retains said leader screen 60 and follower screen 61 forcibly in a state in which the springs 63, 66 are charged, while the other end 69b thereof is extended to inside of the camera base body 1A. What is shown 72 is a stopper pin for restraining the amount of rotationary shifting of the checking lever 69 to counter clockwise direction, and said pin 72 is planted on the photographing optics frame work 1D. And the checking lever 69 is always rotatingly biased to counter clockwise direction by a spring 76 having its one end engaged with a pin 77 planted on the photographing optics frame work and the other end engaged with a pin 77 planted on the checking lever 69. What is shown as 73 is a lever axially supported on the checking lever 69 by a pin 74 planted on the checking lever 69 and one end of said lever 73 has an engaging claw 73a engaged with a pin 75 planted on the checking lever 69, while the other end of the same is engaged with the other end of a pull spring 78 being engaged with a pin 79 planted on the end part 69b of the checking lever 69, thus said lever 73 is always rotatingly biased to clockwise direction. What is shown as 80 is a trigger member being slidably retained at the camera base body 1A, and a trigger button 1F extruding to outside of the camera main body 1 is fixedly provided at one end of said trigger member 80. Said trigger member 80 has a planted pin 81 to control the trigger switch SW$_3$, a planted pin 82 to control the levers 69, 73, and a planted pin 83 for engaging with spring, being provided thereon. One end of a pull spring 84 having the other end engaged with the camera base body 1A is engaged with the pin 83 of the trigger member 80, and the trigger member 80 is always biased to the shifted to such direction the trigger button 1F protrudes out of the camera main body 1. And the pin 81 of the trigger member 80 is so provided as closing the switch SW$_3$ as the trigger button 1F is pressed to the direction of the inside of the camera main body 1, and the pin 82 is placed at a position as coming in contact with the lever 73 as the trigger button 1F is pressed to a direction of inside of the camera main body 1 and being able to rotate said lever 73 to clockwise direction. What is shown as Mg is an electromagnet to retain the shutter follower screen 61 for a certain period of time at a position charging the spring 66 even after the trigger button 1F is pressed and the engagement between the pin 71 on the shutter leader screen 60 and the checking claw part 69a of the checking lever 69 is released then the shutter leader screen runs.

Also the shutter leader screen 60 and the shutter follower screen 61 are made so that the shutter leader screen 60 runs first. The shutter follower screen 61 then runs after an elapse of a prescribed period of time. The shutter leader screen 60 only runs until it comes in contact with the restraining bent part 62b of the retaining plate 62. When the opening 60a of the shutter leader screen 60 and the opening 61a of the shutter follower screen 61 are overlapped they are able to expose the exposure surface of the photo-sensitive sheet material. Then as the shutter follower screen 61 runs until it comes in contact with the restraining bent part 62b of the retaining plate 62, the opening 60a of the shutter leader screen 60 and the opening 61a of the shutter follower screen 61 are again out of alignment relative to each other. This again prevents the external light from impinging onto the exposure surface of the photo-sensitive sheet material 42.

Figure 4:
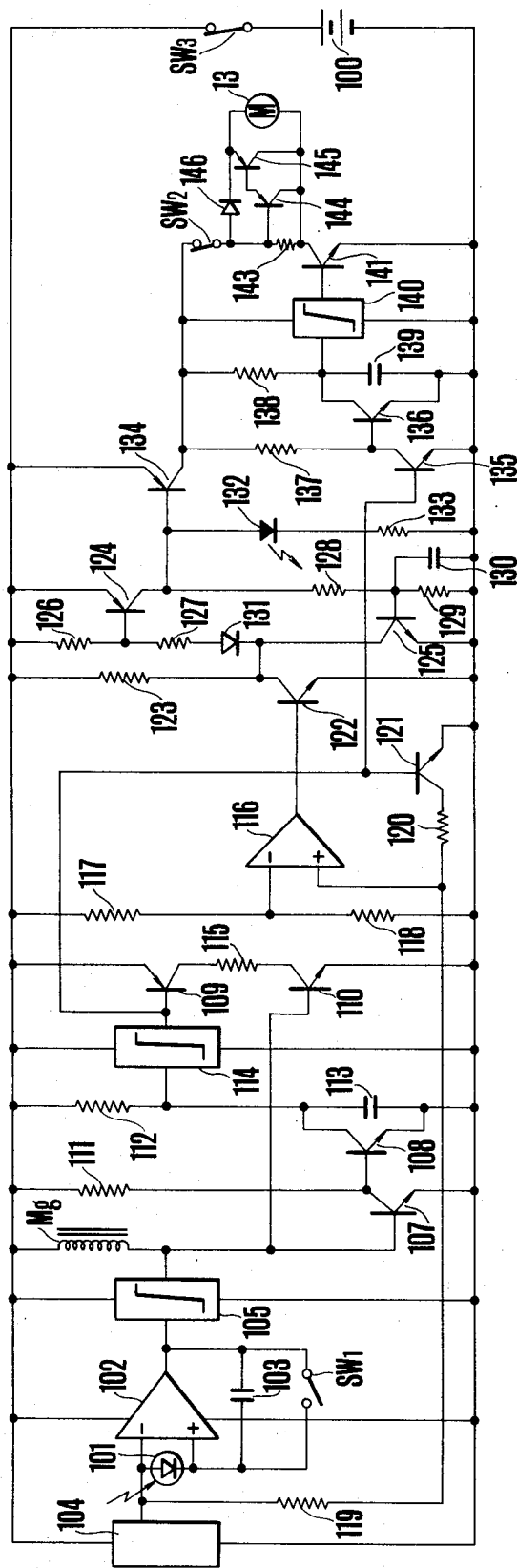
FIG. 4 is a control electric circuit diagram applied to a camera according to the present invention shown in FIGS. 1, 2 and 3.

FIG. 4 is a control electric circuit diagram applied to a camera according to the present invention. The members shown in FIG. 4 with same numbers and symbols as those in FIG. 1 to FIG. 3 are those corresponding to those shown in said preceeding drawings.

In FIG. 4 what is shown as 100 is a power source battery, and SW3 is a switch shown in FIG. 2, and said switch SW3 is provided at such position as being closed by the pin 81 of the trigger member 80 just before the engagement between the pin 71 on the shutter leader screen 60 and the checking claw part 69a of the checking lever 69 is released, and it also has a function as a main switch. What is shown as 101 is a photo-electric conversion element of a photo-electromotive type, for example, a silicone photo-diode. What is shown as 102 is a high input impedance operation amplifier, and 103 is a capacitor for shutter time integration connected between the input and output of the amplifier 102, while SW1 is a switch for starting the time count shown in FIG. 2, and said switch SW1 is for discharge of the capacitor 103. What is shown as 105 is a Schmidt trigger circuit to control the power supply to the electro-magnet Mg shown in FIG. 2, and said Schmidt trigger circuit 105 allows the power supply to the electro-magnet Mg until the shutter leader screen 62 runs and the switch SW1 is placed in an opened state thereby the photo current of the photo-electric conversion element 101 generated corresponding to the brightness of an object is supplied to the capacitor 103, and the output voltage of the operation amplifier 102 reaches the trigger level of the Schmidt trigger circuit 105 or higher, then as the output voltage of the operation amplifier 102 reaches said trigger level of the Schmidt trigger circuit 105, said Schmidt circuit 105 is inversed to block the power supply to said electro-magnet Mg.

That is, said photo-electric conversion element 101, the operation amplifier 102, the capacitor 103, the bias level setting voltage power source 104, the Schmidt trigger circuit 105, the switch SW1, and the magnetizing magnet Mg constitute a photo-sensing time control circuit device, which is to set a period of time from a moment the shutter leader screen 60 runs until the shutter follower screen 61 runs that is the period of time during which the opening 60a of the shutter leader screen 60 and the opening 61a of the shutter follower screen 61 overlap thereby other exposing the photo-sensitive sheet material 42, and such set up is well known in an electric shutter device.

What are shown as 111, 112, 115, 117, 118, 119, 120, 123 are resistors, and what are shown as 107, 108, 109, 110, 121, 122 are transistors, and what is shown as 116 is a comparator, and these elements constitute a power source voltage checking circuit. What is shown as 112 is a resistor, and 113 is a capacitor while 114 is a level detection circuit and these elements constitute a first time constant circuit to check whether or not said motor 13 can properly actuate the camera as power supply to the electro-magnet Mg is stopped. What are shown as 124, 125 are transistors, and 126, 127, 128, 129 are resistors, while 130 is a capacitor, and 131 is a diode, and these elements constitute a latch circuit. What is shown as 138 is a resistance, and 139 is a capacitor, while 140 is a level detection circuit, and these elements constitute a second time constant circuit to count the power supply time to the motor 13. What are shown as 134, 141 are transistors to control the power supply to the motor 13, and SW2 is a switch shown in FIG. 2, and said switch SW2 is a motor control switch closed by the pressing power of the lever 56, as the shutter follower screen 61 runs and the lever 56 is kicked by the engaging part 61d of the shutter follower screen 61 to rotate said lever 56 to counter clockwise direction. What is shown as 132 is a light emission diode for display being connected to the output terminal of the power source voltage checking circuit, and what is shown as 133 is a resistor connected in series to the light emission diode 132. Said light emission diode 132 is placed at a position to have its emission state visually recognized by a finder 1B, and emits light when the power source voltage checked by said power source voltage checking circuit is below a prescribed level to give a warning therefor. What are shown as 135, 136 are transistors to control the count start of said second time constant circuit. What is shown as 141 is a switching transistor which becomes OFF to cut power supply to the motor 13 when the counting of said second time constant circuit is completed. What is shown as 143 is a resistor, and 144, 145 are transistors, while 146 is a diode, and these elements constitute a braking circuit to suddenly stop the rotation of the motor 13 as the mechanical switch SW2 is opened.

Total function of a camera according to the present invention having the set up mentioned above will be now explained using FIG. 1 to FIG. 4.

While a camera according to the present invention has a function allowing to have multiple exposure, first explanations will be made on an ordinary exposure to have one exposure only, while explanations on the multiple exposure will be made later. Therefore in a case of ordinary exposure, the change over member 27 is rotated using the pin 29 as a fulcrum and the engaging part 28a of the click spring 28 and the stop part 27c2 are in an engaged state as shown in FIG. 2. In this state the pressing part 27a of said change over member 27 is placed at a position far from the rotation axle 23. Therefore, said rotation axle 23 is shifted to left direction in FIG. 3 by the pressing power of the spring 26, and the pin 25 is in an engaged state with the short pin 22b of the disk 22 so that the rotation axis 23 and the disk rotate integrally as the rotation axle 23 is rotated. The state of FIG. 3 shows a state just before the shutter charging of the shutter leader screen 60 and the shutter follower screen 61 is completed, and the completion of shutter charge will be secured in a state the pin 19a on the gear 19 comes to a position to come in contact with the branch 49b₁ of the shutter charge lever 49 and said lever 49 rotates to counter clockwise direction using a pin 50 as a fulcrum.

As the trigger button 1F is pressed down to such degree that the engagement between the pin 71 on the shutter leader screen 60 and the checking claw part 69a of the checking lever 69 will not be released in a state the shutter charge is completed, the switch $SW_3$ is closed by the pin 81 on the trigger member 80. As said switch $SW_3$ is closed the voltage check of the power source battery 100 is done. The power source voltage check at this time is done not only for checking whether or the voltage of the power source battery 100 can properly drive the motor 13, but also is done for checking whether or not the photo-sensing time control circuit device can properly function, by the resistors 117, 118 and the comparator 116. That is, when the voltage of the power source battery 100 is at a voltage level as being able to properly activate the photosensing time control circuit device or higher, and the switch $SW_3$ is closed the inversion input terminal of the comparator 116 has higher voltage level than that of the non-inversion input terminal where bias voltage is supplied from the constant voltage power source 104. Now, the comparator 116 is not inversed and the transistors 122, 124, 125 are left OFF. The light emission element 132 does not now emit light. This confirms that the voltage of the power source battery 100 is at least at a level to properly activate the photo-sensing time control circuit device. On the other hand, when the voltage of the power source battery 100 is not at a level able to properly activate the photo-sensing time control circuit, and the switch $SW_3$ is closed the inversion input terminal of the comparator 116 has lower voltage level than that of the non-inversion input terminal. Now the comparator 116 is inversed and the transistors 122, 124, 125 are ON. Hence, the light emission element 132 emits light, warning an operator that the voltage is at a level not being able to properly activate the photo-sensing time control circuit. The power source battery 100 is then replaced with new one or the use of the camera is suspended.

When the switch $SW_3$ is closed by the first step pressing down of the trigger button 1F and the light emission element 132 does not emit light, the voltage of the power source battery 100 is at a level at least being able to properly activate the photo-sensing time control circuit device also the electro-magnet Mg is magnetized and attracts and retains the shutter follower screen 61, but as the trigger button 1F is further pressed down such power as rotating to clockwise direction is given to the lever 73 by the pin 82 on the trigger member 80, and the power given to said lever 73 is transmitted to and activates the checking lever 69 as the pin 75 on the checking lever 69 and the checking claw 73a of the lever 73 are engaged, to rotate said checking lever 69 to clockwise direction, releasing the engagement between the pin 71 on the shutter follower screen 60 and the checking claw 69a of the checking lever 69. As the engagement between the pin 71 on the shutter leader screen 60 and the checking claw 69a on the checking lever 69 is released the shutter leader screen 60 runs until it comes into contact with the restraining bent part 62b of the retaining plate 62 by the charging power of the spring 65, while the opening 60a of the shutter leader screen 60 and the opening 61a of the follower screen 61 are placed in an overlapped state, thus exposure of the exposure surface of the photo-sensitive sheet material is done. On the other hand, when the trigger button 1F is fully pressed down the pin 82 of the trigger member 80 passes over the lever 73 and the engagement between the lever 73 and the pin 82 is released therefore the checking lever 69 is rotated to counter clockwise direction by the biasing power of the checking lever 69, and is returned to a position at which the checking lever 69 comes in contact with the pin 72, that is a position at which the checking claw 69a of the checking lever 69 can engage with the pin 71 on the shutter leader screen 60. As the shutter leader screen 60 runs the power of said shutter leader screen 60 to press the switch $SW_1$ is released, thus said switch $SW_1$ is opened. As said switch $SW_1$ is opened the charging of such photo current as generated corresponding to the brightness of an object is started at the capacitor 103, thus charging of the capacitor 103 is done, then as the output voltage of the operation amplifier 102 goes up to the trigger level of the Schmidt trigger circuit, said Schmidt trigger circuit is inversed and power supply to the electro-magnet Mg is stopped. As said power supply to the electro-magnet Mg is stopped the attracting power of the electro-magnet Mg disappears, therefore, the shutter follower screen 61 which has been attracted and retained by the electro-magnet Mg runs by the spring charge power until it comes in contact with the restraining bent part 62b of the retaining plate 62, and the opening 60a of the shutter leader screen 60 and the opening 61a of the shutter follower screen 61 are placed in the position not matching with each other again, thus exposure on the exposure surface of the photo-sensitive sheet material 42 is completed. Said shutter follower screen 61 runs, and the engaging part 61d of said shutter follower screen 61 kicks the lever 56 just before said shutter follower screen 61 comes in contact with the restraining bent part 62b of the retaining plate 62, rotating the lever 56 to counter clockwise direction using the pin 57 as a fulcrum, and one end 56b of said lever 56 passes over the recess 54a of the cam part 54 to place the switch $SW_2$ in a closed state. On the other hand, at a same time as the power supply to the electromagnet Mg is cut out and the shutter follower screen 61 runs, the transistors 107, 109, 110 become ON and the transistor 108 is placed in OFF state. As these transistors 107, 109, 110, 108 are controlled, the first time constant circuit (112, 113, 114) starts counting, flowing dummy current to a dummy resistance 115. This first time constant circuit is to flow dummy current almost equivalent to the power supply current to the motor 13 to the dummy resistance 115 to insure that the motor 13 is properly activated at least until the take out of the photo-sensitive material is completed. Therefore, when the current of the power source battery 100 is made to flow to the first time constant circuit and the dummy resistance 115 and the power source voltage becomes to have a level below a prescribed level while the capacitor 113 has its charging completed, the immersion input terminal of the comparator 116 has lower voltage than that of the non-inversion input terminal to which bias voltage is supplied from the constant voltage source 104 of the comparator 106, therefore said comparator 116 is inversed and the transistor 122 becomes ON, but as the transistors 134, 144 are in OFF state, the power supply to the motor circuit is prohibited, also the light emission element emits light to inform the operator that the voltage of the power source battery does not have a level to properly operate the motor 13. However, in this case, since the voltage of the power source battery 100 was in a state being able to properly activate the photo-sensing time control circuit device in the previous power source voltage check, said activated photo-sensing time control circuit device always works properly, and after completion of the exposure only the photo-sensitive material take out device to take out the photo-sensitive sheet material 42 to outside of camera does not work properly. Therefore in this case the power supply to the motor circuit is automatically prohibitted by the previous power source voltage check by the checking circuit and as said transistor 122 becomes ON even momentarily the transistors 124, 125 also become ON and the latch circuit will have positive feedback thus self retention is made, therefore the motor 13 to drive the photo-sensitive material take out device is not driven, and the exposed photo-sensitive sheet material 42 is left housed in the camera. Therefore in this case the driving of the photo-sensitive material take out device is done manually in place of the motor 13. That is, when the photo-sensitive material take out device is driven manually the manual handling lever 2 is pulled up and is rotated to clockwise direction, then the rotation of the handling lever 2 is tramsmitted to the gear 8 through the rotation axle 3, one way clutch device 7 and the rotation axle 4. As the gear 8 rotates, said rotation is transmitted to the gear 31 through the over-drive gear mechanism of the gears 21, 30, $32_1$, $32_2$, 34, 36, to rotate the photo-sensitive material take out rollers 38, 39 at almost a constant speed. At a same time as the rotation of said take out rollers 38, 39 is started the rotation of the gear 21 is transmitted to the disk 22 through the rotation axle 23, the pins 25, 22b and as said disk 22 rotates together with the gear 21, the long pin 22a of said disk 22 pushes the engaging part 43c of the base plate 43 to right direction in FIG. 2, shifting the base plate 43 to a direction to which the photo-sensitive sheet material 42 is taken out. As said base plate 43 is shifted the photo-sensitive sheet material 42 passes through the photo-sensitive material take out outlet 41a of the cartridge by the leaf spring 46 for taking out the photo-sensitive material and is carried to a position at which it is sandwiched by the rollers 38, 39. As the exposed photo-sensitive sheet material 42 is carried to a position at which it is sandwiched between the rollers 38, 39, since the rollers 38, 39 are rotated by the rotatary driving of the manual handling lever 2, it is sandwiched by the rollers 38, 39, thus the photo-sensitive sheet material 42 will be taken out to outside of the camera main body 1 while having self developing process conducted on itself. As the exposed photo-sensitive sheet material 42 is being taken out as mentioned above, the shutter charge lever 49 is rotated to clockwise direction by the biasing power of the spring 52 along with the shifting of the pin 19a on the gear 19 to the direction of the branch $49b_2$ of said lever 49. At a time of rotation of said lever 49 to clockwise direction, the engaging end 49a of said lever 49 and the engaging part 60b of the shutter leader screen 60 are engaged with each other, and the shutter leader screen 60 is slidingly shifted to right direction in FIG. 2 resisting the biasing power of the spring 65, and when said shutter leader screen 60 is slided to right direction the pin 68 planted on the shutter follower screen 61 and the shutter leader screen 60 are engaged with each other, therefore the shutter leader screen 60 and the shutter follower screen are simultaneously slided to right direction in FIG. 2 by the rotation of the lever 49 to clockwise direction until the pin 71 on the shutter leader screen 60 and the checking claw 69a of the checking lever 69 are engaged with each other again, and the charging of the spring 65 which actuate the shutter leader screen 60 and the spring 66 which actuates the shutter follower screen 61 is done, thus exposure, developing and take out of the photo-sensitive sheet material are completed. Also, when the manual handling lever 2 is rotated to drive the photo-sensitive take out device manually, the rotation of the manually handling lever 2 will have a constant speed by the governor device by the gears 6, $14_1$, $14_2$, $15_1$, $15_2$ and flat disk 18 and the over-drive device by the gears 8, 19, 21, 30, $32_1$, $32_2$, 35, 36.

On the other hand, when the current of the power source battery 100 is made to flow to the first time constant circuit and the dummy circuit 115 and the power source voltage does not come under a prescribed level while the capacitor 113 has charging of itself completed, the comparator 116 is not inversed and the transistors 122, 124, 125 are left in OFF state, while the light emission element 132 does not emit light and at a same time the transistor 134 maintains its ON state, thus meaning that the power supply to the motor circuit is possible. And as the capacitor 113 of the first time constant circuit is charged and said first time constant circuit is inversed the transistor 135 becomes ON while the transistor 136 becomes OFF, then the second time constant circuit consisting of the resistor 138, the capacitor 139 and the level detection circuit 140 starts counting by actuation of said transistors 135, 136, and as the charging of the capacitor 139 of said second time constant circuit is completed the level detection circuit is inversed and the transistor 141 becomes ON. When said transistor becomes ON the lever 59 has been rotated to counter clockwise direction by preceeding run of the shutter follower screen 61 and the switch $SW_2$ has been placed in closed state by said lever 59, therefore the motor 13 starts rotation. As the motor 13 rotates, the rotation of said motor 13 is transmitted to the rotation axle 5 through the gears 14, 12, 11, 9, further transmitted to the rotation axle 4 through one way clutch $7_2$ to rotate the gear 8. Since said one way clutches $7_1$ and $7_2$ are so made that when the rotation is transmitted from the rotation axle 3 to the rotation axle 4 through one way clutch $7_1$ the rotation of said rotation axle will not be transmitted to the rotation axle 5, also when the rotation is transmitted from the rotation axle 5 to the rotation axle 4 through the one way clutch $7_2$, the rotation of the rotation axle 4 will not be transmitted to the rotation axle 3, therefore even if the rotation of the motor 13 is transmitted to the rotation axle 4, the rotation axle 3 will not be rotated.

And as the gear 8 is rotated, the rotation of said gear 8 is transmitted to the gear 31 through the gears 19, 21, 30, $32_1$, $32_2$, 35, 36, in turn, thus the taking out of the exposed photo-sensitive sheet material 42 and shutter charge are done while self developing process of the sheet material is done as in the case of the above mentioned manual operation. On the other hand as the gear 8 rotates the gear 53 engaging with said gear 8 is rotated and the cam member 54 rotates integrally with the gear 53. As said cam member 54 starts rotation, the other end 56b of the lever 56 comes in contact with the large diameter part of the cam member 54, and the lever 56 is rotated to counter clockwise direction and the switch $SW_2$ is retained in a closed state until the recess 54a of the cam member 54 comes in contact with the other end 56b of the lever 56 again. Therefore, even after the shutter leader screen 60 and the shutter follower screen 61 have shutter charge done thereon by the shutter charge lever 49 the motor circuit of the motor 13 is kept in a closed state. And as the rotation of the cam member 54 proceeds and said recess 54a comes in contact with the other end 56b of the lever 56, the other end 56b of the lever 56 drops into the recess 54a of the cam member 54, and said lever 58 rotates to clockwise direction, also the switch $SW_2$ is opened, thus power supply to the motor 13 is stopped. And as the pressing power to depress the trigger button 1F is released after confirming that the driving power of the motor 13 is stopped, the trigger member 80 returns to its original position by the biasing power of the spring 84. While the pin 82 on said trigger member 80 has been at a position being over the lever 73 by said pressing down action of the trigger button before the trigger member 80 is returned, as the pin 82 on the trigger member 80 comes in contact with the lever 73 as the trigger member 80 is returned, said lever 73 only rotates to counter clockwise direction using the axle 74 as a fulcrum, and the trigger member 80 returns to the state of FIG. 2 to open the switch $SW_3$ again, without rotating the checking lever 69.

Next, when multiple exposure is desired, the engaging part 28a of the click spring 28 is made to engage with the stop part $27c_1$. In this state the pressing part 27a of the change over member 27 is in a state that the rotation axle 23 is shifted to a direction of an arrow C in FIG. 3 resisting the pressing power of the spring 26, and the pin 25 on the rotation axle 23 is placed at a position at which it can not be engaged with the short pin 22b of the disk 22 so as not to transmit the rotation of the rotation axle 23 to the disk 22 when the rotation axle 23 is rotated. Therefore as in the one time exposure explained above, even when the shutter is activated and the gear 8 is rotated by driving of the motor 13 or by manual manner, the rotation power thereof will not be transmitted to the disk 22. Therefore only the charging of the shutter device is done and the photo-sensitive sheet material will not be taken out, thus if the handling of the trigger button 1F is repeated as many times as the number of multiple exposure desired, the multiple exposure of the number of handling of the trigger button 1F will be done. And before the last exposure of complete said desired number of exposures is done, the change over member 27 is rotated again and the engaging part 28a of the click spring 28 and the stop part $27C_2$ are made to engage, further, the short pin 22b of the disk 22 and the pin 25 of the rotation axle 23 are placed in an engageable state again as shown in FIG. 3, and then the last exposure is done, thus the exposed photo-sensitive sheet material 42 is taken out of the camera main body 1 while having the self developing process done thereon in a similar manner as explained for ordinary one time exposure. The multiple exposure is thus completed.

As has been explained above a camera using a photosensitive sheet material being able to have self developing process according to the present invention is so made that it is checked before starting exposure whether or not the voltage of the power source battery 100 is at a level being able to properly operate the photo-sensing time control circuit device and at a same time the result of said checking is displayed by the light emission element 132, also it is checked whether or not the voltage of the power source battery 100 is at a level being able to properly operate the motor 13 to take out the photo-sensitive sheet material 42 to outside of the camera after the photo-sensing time control circuit device is activated and the same is displayed by the light emission element 132, then when the voltage of the power source battery 100 is at a prescribed level or higher power is supplied to the motor 13, while said power supply is stopped when said voltage is below said prescribed level, so that the take out of the photo-sensitive sheet material 42 to outside of camera is done manually. Thus the speed at which the photo-sensitive sheet material 42 is taken out of the camera is stable, thus the self developing process of the sheet material 42 is done with uniform period of time, preventing uneven developing shots. Also after it is confirmed thus the voltage enough to properly drive the motor 13 is in the power source battery 100 as the checking of the power source voltage for the motor 13 is done, the non-inversion input voltage for the comparator 116 is lowered by making the transistor 121 ON, therefore even if the load of the motor 13 becomes large by some reason after the motor 13 is driven and the voltage of the power source voltage 100 becomes below the prescribed level, the comparator 116 will not be inversed, thus such accident that the power supply to the motor circuit is suspended before the take out of the photo-sensitive sheet material 42 is completed, once the power supply to the motor 13 is started can be prevented.

Figure 5:
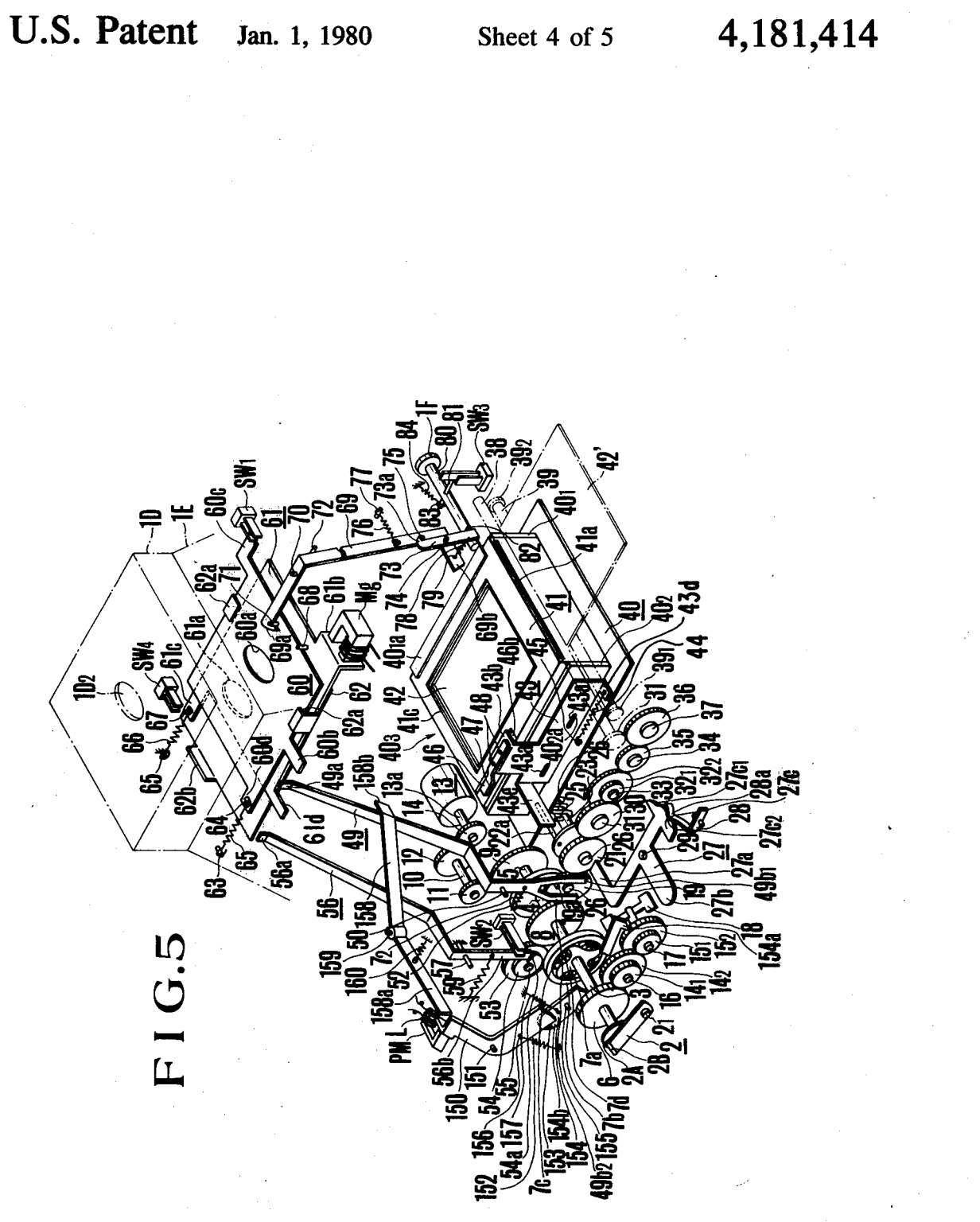
Figure 6:
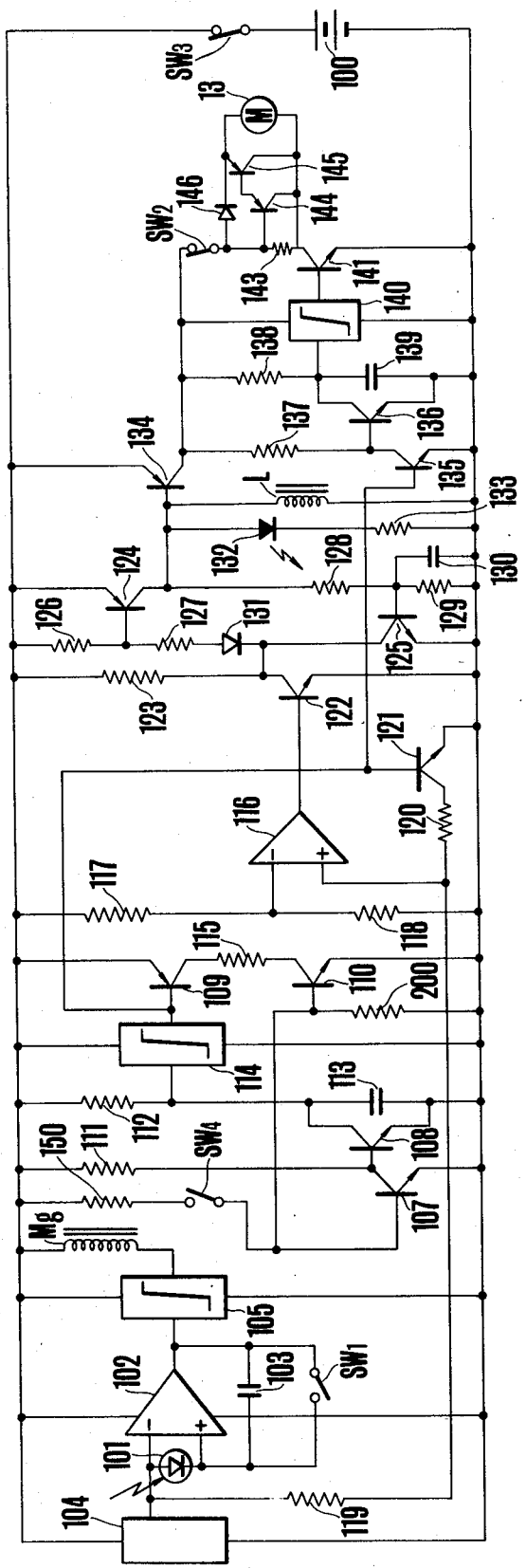

FIGS. 5 and 6 are to show a second example of the present invention, modifying a portion of the first example shown in FIGS. 1 to 4, wherein FIG. 5 is an oblique view to show a set up of the important members provided within a camera, while FIG. 6 is a control electric circuit diagram to activate the camera shown in FIG. 5. The members shown with same numbers and symbols as those for the members shown in FIGS. 1 to 4 have same function as those.

While the first example shown in FIGS. 1 to 4 has such set up that the base circuits of the transistors 110 and 107 are connected to the output terminal of the Schmidt trigger circuit 105 and the switch $SW_1$ is opened as the shutter leader screen 60 runs, thus the capacitor 103 of the photo-sensing time control circuit is charged, further as the capacitor 103 is charged to such level that the output voltage of the operation amplifier 102 becomes the trigger level or higher of the Schmidt trigger circuit 105, the power supply to the electro-magnet Mg is stopped to run the shutter follower screen 61 and at a same time the checker circuit to check the voltage level of the power source for the motor 13 is activated, the example 2 has such set up that when the shutter leader screen 60 runs and said shutter leader screen 60 comes in contact with the restraining bent part 62a of the retaining plate 62, the switch $SW_4$ closed by the end of the shutter follower screen 61 and the resistance 150 connected in series to said switch $SW_4$ are connected to the base circuits of the transistors 110 and 107, for elminating the connection between the base circuits of said transistors 110, 107 and the Schmidt trigger circuit 105. What is shown as 200 is a resistance to make the transistor 107 and 110 OFF as the switch $SW_4$ is opened. Therefore this example 2 is so made that as the shutter leader screen 60 runs the switch $SW_4$ is opened and the transistors 107, 109, 110 becom ON while the transistor 108 becomes OFF, then the first time constant circuit (112, 113, 114) starts counting to check the power source voltage level for the motor 13. Also in this example 2, a coil L is further inserted and connected in parallel with the light emission element 132. Said coil L is to be magnetized together with said light emission element 132 when the power source voltage is determined to be improper as the voltage of the power source battery 100 is checked and the light emission element 132 emits light, thus to control the safety device newly added in this example 2. Said safety device newly added in this example 2 is to prevent careless handling of the manual handling lever 2 to give undesirable effects to the motor driving when the take out of the photo-sensitive sheet material 42 is done by motor driving in a state that the voltage of the power source battery 100 is at a level to properly operate the motor 13. And details of this safety device is shown in detail in FIG. 5. A member shown as 150 constituting the safety device is a swing lever fixed to the rotation axle 151 being axially supported at the camera base body 1A in a rotatable manner, and said swing lever 150 is always rotatingly biased to clockwise direction by a pull spring 15 having one end engaged with the camera base body 1A and the other end engaged with a pin 156 planted on said swing lever 150, and at a same time one end 150a of said swing lever 150 is at a position at which it can contact with a permanent magnet PM as said swing lever 150 rotates to counter clockwise direction. What is shown as 154 is an engaging lever fixed at the rotation axle 155 a axially supported to the camera base body 1A in a rotatable manner, and an engaging part 154a, which is engaged with the tooth of the gear $15_2$ as said engaging lever 154 is rotatingly shifted to clockwise direction for preventing the rotation of the gear $15_2$, is provided at one end of said engaging lever 154, while a protruding pin 153 is planted at the other end 154b. What is shown as 157 is a pull spring having its one end engaged with the camera base body 1A and the other end engaged with the other end 154b of the enegaging lever 154, and said spring 157 is to always bias rotatingly the engaging lever 154 to clockwise direction. The relationship between said swing lever 150 and the engaging lever 154 is such that the protruding pin 153 of the engaging lever 154 and one end of the swing lever 150 are always linkedly engaged so that as the swing lever 150 is rotatingly shifted to counter clockwise direction, the engaging lever 154 is rotatingly shifted in as association with the shifting of the lever 150 in such manner that the checking part 154a of the checking lever 154 engages with the gear $15_2$, and contrary thereto as the swing lever 150 is rotatingly shifted to clockwise direction the engaging lever 154 is rotatingly shifted to counter clockwise direction in such manner that the engagement between the checking part 154a and the gear $15_2$ is released. What is shown as 158 is a rotation lever axially supported in a rotatable manner to a fixed axle 159 being fixed to the camera base body 1A, and one end of said rotation lever 158 is extended to such position as being able to come in contact with one end 150a of said swing lever 150 and to rotatingly shift said swing lever to counter clockwise direction, as said rotation lever 158 is rotatingly shifted to clockwise direction, while the other end thereof is placed at such position as being able to contact with the lever 49 and to have the rotation lever 158 rotated to clockwise direction when the shutter charge lever 49 is rotated to clockwise direction to conduct shutter charge. Therefore, said rotation lever 158 is kicked by the lever 49 every time the shutter charge lever 49 is rotated to clockwise direction to conduct shutter charge to attract the swing lever 150 to the permanent magnet PM, and when said swing lever 150 is attracted to the permanent magnet PM, the checking part 154a of the engaging lever 154 is engaged with the tooth of the gear $15_2$. And said permanent magnet PM has said coil L wound around the same, and as power is supplied to said coil L, the attracting power of the permanent magnet PM is weakened to release the attraction and retention of the swing lever 150.

That is, since the swing lever 150 is attracted and retained by the permanent magnet PM direction and is at a state being rotatingly shifted to counter clockwise as power is not supplied to the coil L when the shutter charge is done, thereby the checking lever 154 is also rotatingly shifted to clockwise direction. Therefore the checking part 154a of the checking lever 154 is engaged with the tooth of the gear $15_2$ and even if a trial is made to rotate the manual handling lever 2, it can not be rotated. And after the pressing down of the trigger button 1F is done and the shutter operation is done, the power source voltage check for the motor 13 is done by said checking circuit, and when the voltage level of the power source battery 100 is sufficient to properly drive the motor 13, power supply is not done to the light emission element 132 and the coil L, therefore the attraction of the swing lever 150 by the permanent magnet PM is retained, thus the state in which the checking part 154a of the checking lever 154 is engaged with the tooth of the gear $15_2$ will be further retained. Therefore, while the take out of the photo-sensitive sheet material is automatically done by driving of the motor 13 in said state, even if a trial is made by carelessness to rotate the manual handling lever 2 during said take out operation, said manual handling lever 2 can not be operated, thus no bad effect will be given to the automatic take out operation at this time.

On the other hand, after the shutter operation is done by pressing down of the trigger button 1F, the power source voltage check for the motor 13 is done by the checking circuit and as the voltage level of the power source battery 100 is not sufficient to properly drive the motor 13, since power is supplied to the light emission element 132 and the coil L, the attracting power of the permanent magnet PM is weakened and the swing lever 150 is rotated to clockwise direction by the biasing power of the spring 153. And the checking lever 154 is also rotated to counter clockwise direction in an association with the rotating shift of the swing lever 150 to clockwise direction, and the engagement between the checking part 154a of said checking lever 154 and the tooth of the gear $15_2$ is automatically released. Therefore, rotation handling of the manual handling lever can be made in this state.

That is, a camera according to this example 2 is so made that a safety device is released only when the take out of photo-sensitive sheet material 42 can not be done by motor driving allowing the manual handling, thus there will be no such undesired effect that the manual handling lever 2 is operated by error while the photo-sensitive sheet material 42 is being taken out by motor driving giving bad effect over the take out operation by motor driving.

According to one embodiment of the invention the body 1 with its optical portions 1D may for example contribute what might be called a first device for shielding and exposing the photo-sensitive film. The cartridge 41 and its associated mechanisms for feeding and expelling the film may be regarded as a second device for holding the sheet film. Of course, the invention may be embodied otherwise and this language covering first an, second devices should not be taken as limiting;

What is claimed is:

1. A camera device of the self developing type using photo-sensitive sheet material having a means to store developer liquid and forming a visible image after a processing by said developer liquid in said storage bag after exposure, comprising:
(a) a power source circuit to actuate said camera device;
(b) a first device for covering exposure and permitting exposure of the sheet material; and
(c) a second device coupled to the first device for holding the sheet material, having:
  feeding and removing means to advance said photo-sensitive material after exposure and to process said exposed photo-sensitive material with the developer liquid during the advance as well as to remove the material from said second device;
  a first driving means having a motor coupled to the conductive means to be driven by the power of the power source and for actuating said feeding and removing means;
  a second driving means to actuate said feeding and taking out means manually, said second driving means having a handle operable from outside of said second device; and
  a checking means to check the power of said power source circuit, and stopping means responsive to the checking means to stop power supply to said motor when the power of said power source circuit is not enough to operate said motor at a prescribed speed.

2. A camera device, according to claim 1, in which said checking means has a display means to display whether or not the power of said power source circuit is enough to operate said motor at a prescribed speed.

3. A camera device according to claim 1, in which said second device has a means to so lock said second driving means in a disabled condition, said locking means being actuated in response to actuation of said stopping means.

4. A camera device according to claim 1, in which said checking means has a dummy circuit to draw a dummy current substantially equivalent to the current necessary to properly operate said first driving device by said motor from said power source circuit as said power source circuit is checked.

5. A camera device according to claim 1, in which said checking means has a latch circuit to prevent said stopping means from being activated until the next checking action is done when the power of the power source circuit is determined to be enough to properly operate said motor at a prescribed speed by one checking action.

6. A camera device of the self developing type using photo-sensitive sheet material having a means to store developer liquid and forming a visible image after a processing by said developer liquid in said storage bag after exposure, comprising:
(a) a power source to actuate said camera device;
(b) a trigger means to initiate the operation of said camera device;
(c) a first device to have a photo-sensitive surface of said photo-sensitive material exposed, having:
  a shutter means to control the exposure onto said photo-sensitive surface, and
  a switch means controlled by actuation of said shutter means;
(d) a second device to which said photo-sensitive material is loaded, having:
  a feeding and taking out means to advance said photo-sensitive material after exposure and to process said exposed photo-sensitive material by said developer liquid in a course of said advancing, and to take the material out of said second device;
  a first driving means having a motor driven by the power of said power source battery and activating said feeding and taking out means by the driving power of said motor; and
  a second driving means which can activate said feeding and taking out means manually, said second driving means having a handle operable from outside of said second device;
(e) a test means containing a motor testing circuit to test whether the power of said power source is enough to operate said motor at a prescribed speed upon initiation of said switching means; and
(f) a stopping means coupled to the test means to stop power supply to said motor when the power of said power source is not enough to operate said motor at a prescribed speed, said stopping means being connected to said test means and is controlled in response to said test means.

7. A camera device according to claim 6, in which said shutter means operates on the basis of the power of said power source and said test means has a shutter test circuit to test whether or not the power of said power source is enough to actuate said shutter means.

8. A camera device according to claim 7, in which said shutter test circuit is functionally coupled with said trigger means so as to be activated in an association with said trigger means.

9. A camera device according to claim 6, in which said second device has a shutter charge means to conduct shutter charging of said shutter means in an association with the action of said feeding and taking out means.

10. A camera device according to claim 6, in which said second device has a switching device to cut the power supply to the motor of said first driving means in correspondence with the taking out of said photo-sensitive material to outside of the second device by the feeding and taking out means.

11. A camera device according to claim 6, in which said second driving means has a speed control means to drive said feeding and taking out means with a constant speed.

12. A camera device according to claim 7, in which said checking means has one display means to display both outputs of said motor checking circuit and of said shutter checking circuit.

13. A camera device according to claim 6, in which said second device has a means to lock said second driving means in a disabled state, said locking means being actuated by the activation of said stopping means.

14. A camera device according to claim 6, in which said motor test circuit has a dummy circuit to draw a dummy current substantially equivalent to the current necessary to properly activate said first driving device by said motor from said power source battery as the power of said battery is tested.

15. A camera device according to claim 6, in which said test means has a latch circuit to prevent said stopping means from functioning until a next test when the power of the power source battery is determined to be sufficient to operate said motor is a prescribed speed by a first test.

16. A camera device of the self developing type using photo-sensitive sheet material having means to store developer liquid and forming a visible image after a processing by said developer liquid in said storage bag after exposure, comprising:
(a) a camera body including a first device for covering and exposing the photo-sensitive surface of said sheet material and a second device to which said sheet material is loaded;
(b) conductive means in the body for receiving current from a battery;
(c) photographic optical means in said first device for producing the image of an object on the photo-sensitive surface of a loaded sheet material in said second device;
(d) feeding means to advance said sheet material after exposure and process said exposed sheet material with said developer liquid while the material advances and to move the material out of said second device, said feeding means being mounted in said second device and engageable with the loaded sheet material in said second device;
(e) drive means in said second device and coupled to said conductive means for actuating said feeding means, said drive means including a motor driven by the power of the battery through the conductive means, said motor being operatively coupled with said feeding means; and
(f) check means in said body and coupled to said conductive means for checking the power of the battery connected to the conductive means, and stopping means responsive to the checking means to stop power supply to said motor when the power of a battery connected to the conductive means is not enough to operate said motor at a prescribed speed.

17. A camera device according to claim 16, in which said check means includes display means to display whether or not the power of a battery connected to the conductive means is enough to operate said motor at a prescribed speed.

18. A camera device according to claim 16, in which said check means includes a dummy circuit to fraw a dummy current substantially equivalent to the current necessary to properly operate said feeding means with said motor from said power source battery, as a battery connected to the conductive means is checked.

19. A camera device according to claim 16, in which said check means has a latch circuit to prevent said stopping means from being activated until next checking action is performed when the power of a battery connected to the conductive means is determined to be enough to properly operate said motor at a prescribed speed by one checking action.

20. A camera device of the self developing type using photo-sensitive sheet material having a means to store developer liquid and forming a visible image after a processing by said developer liquid in said storage bag after exposure, comprising:
(a) a camera body including, a first device to cover and expose the photo-sensitive surface of said sheet material, and a second device to which said sheet material is loaded;
(b) conductive means in the body for connection to a power source;
(c) a photographic optical system in said first device for producing the image of the object on the photo-sensitive surface of a loaded sheet material in said second device;
(d) shutter means in said first device, said shutter means shielding the object light reaching said photo-sensitive surface of a loaded sheet material in said second device through said photographic optical system;
(e) shutter control means in said body for releasing said shutter means for a predetermined period of time and exposing the photo-sensitive surface of a loaded sheet material, said control means being actuated by the power of said battery and being operatively coupled with said shutter means;
(f) feeding means to advance said sheet material after exposure and to process said exposed sheet material with the developer liquid during the advance and to move the material outside of said second device, said feeding means being mounted in said second device and engageable with the loaded sheet material in said second device;
(g) drive means in said second device and connected to said conductive means for actuating said feeding means, said drive means including a motor driven by power source connected to the conductive means, said motor being operatively coupled with said feeding means; and
(h) check means in said body for checking the power of a power source connected to the conductive means, said check means having stopping means to stop power to said motor when the power of a power source connected to the conductive means is enough to operate said motor at a prescribed speed.

21. A camera device according to claim 20, in which said check means includes display means to display whether or not the power of a power source is enough to operate said motor at a prescribed speed.

22. A camera device according to claim 20, in which said check means has a dummy circuit to draw a dummy current substantially equivalent to the current necessary to properly operate said feeding means with said motor from a power source connected to conductive means as a power source is checked.

23. A camera device according to claim 20, in which said check means includes a latch circuit to prevent said stopping means from being activated until the next checking action is performed when the power of a power source connected to said conductive means is determined to be enough to properly operate said motor at a prescribed speed by one checking action.

* * * * *